United States Patent Office 2,738,569
Patented Mar. 20, 1956

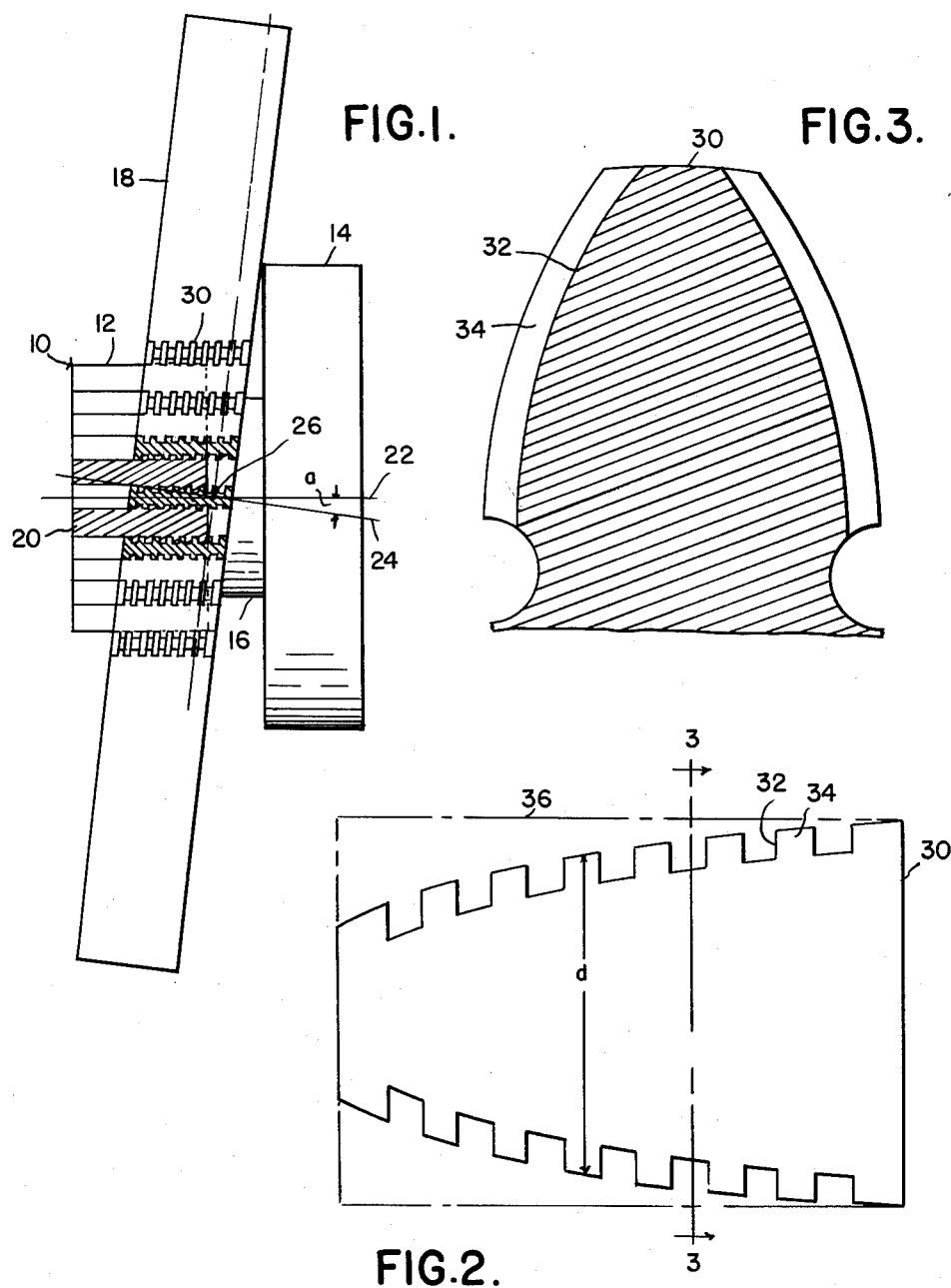

2,738,569

TOOL FOR FINISHING GEARS

Walter S. Praeg, Detroit, Mich., assignor to National Broach & Machine Company, Detroit, Mich., a corporation of Michigan Application November 13, 1950, Serial No. 195,418

2 Claims. (Cl. 29—103)

The present invention relates to a method of and tool for finishing gears.

The present application is a continuation-in-part of my prior copending application, Serial No. 609,136, filed August 6, 1945, now abandoned.

The invention relates to the finishing of gears and refers more particularly to finishing of the teeth of shoulder gears by shaving.

It is an object of the present invention to finish the teeth of a shoulder gear by shaving in a manner to enable satisfactory finishing of shoulder gears having relatively small widths of gaps between the shoulders and the adjacent ends of the gear teeth.

It is a further object of the present invention to finish the teeth of a shoulder gear by shaving with a gear-like cutting tool having teeth decreasing in chordal thickness or tapering substantially from one end to the other end in a direction away from the shoulder of the gear, to enable removing the material from the gear teeth from end to end and also to eliminate excessive pressures between the tool teeth and the gear teeth while the gear teeth are being shaved.

It is a further object of the present invention to provide an improved tool for shaving the teeth of the shoulder gear, characterized in that its teeth decrease in chordal thickness from one end to the other at an increasing rate.

Other objects and features of the invention will become apparent as the description proceeds, especially when taken in conjunction with the accompanying drawings, wherein:

Figure 1 is a diagrammatic top plan view of a cutting tool and shoulder gear arranged in operative relation to each other.

Figure 2 is a top plan view of a tooth of a cutting tool suitable for carrying out the present invention.

Figure 3 is a transverse cross-section on the line 3—3, Figure 2.

In crossed axes gear shaving of the type referred to a gear and gear-like tool are meshed with their axes crossed in space. In the present invention the gear whose teeth are being finished and the gear-like tool or cutter are both of helical-spur type. In other words, both of the gear and cutter are cylindrical members having pitch cylinders.

The method may be practiced to finish the teeth of a spur gear by employing a helical cutter, and to finish the teeth of a helical gear by employing a cutter the teeth of which are either spur or helical. The helix angle of the cutter is selected with reference to the helix angle of the gear such that the gear and tool mesh normally with their axes crossing at a small angle, as for example between 3 and 15 degrees. In the case of a shoulder gear it is obvious that the amount of crossed axis may be limited by a condition of interference which will exist between the cutter and the shoulder adjacent the gear teeth to be shaved. This situation results in the necessity of employing a smaller crossed axis angle than is considered to be most efficient.

It is a property of spur-helical gears that when meshed with their axes crossed as contemplated in the present invention, the tooth surfaces of the gear-like parts engage in theoretical point contact. Due to the fact that the teeth of the cutter are interrupted by gashes, and due also to deformation of metal, the actual contact between the teeth of the gear-like parts extends over a substantial area. This is to be compared to the condition which exists when a pair of spur-helical gear-like parts are meshed with their axes parallel. In such a case there is full line contact between the teeth of the parts. The shaving operation which is carried out by the present method depends in part upon the relatively small area of contact between the teeth of the gear and cutter. As the interference condition referred to above, requires the crossed axes angle to be rather small, the gear-like parts approach a condition wherein their teeth contact over an extended and excessive area.

According to the present invention the teeth of the cutter are modified slightly from end to end so that even at very small crossed axes, contact between the teeth of the gear and cutter is limited to a relatively small zone adjacent the large end of the teeth of the cutter and clearance exists toward the small end of the cutter teeth.

As best seen in Figure 1, there is illustrated a shoulder gear 10 including a small gear 12 and a large shoulder 14 which may in some cases be a second gear. The gear 12 and shoulder 14 are separated by a reduced portion 16. In this figure there is illustrated a helical cutter 18 and the teeth 20 of the gear 12 are illustrated as being spur teeth. Since the teeth of the gear 12 are spur teeth and the teeth of the cutter 18 are helical teeth, the gear and tool will mesh with their axes crossed at a small angle as indicated at $a$. The axis of the gear is illustrated at 22 and the axis of the cutter is illustrated at 24. In the arrangement illustrated in Figure 1 it will be appreciated that the axes 22 and 24 are both parallel to the plane of the paper and that a line 26 may be drawn perpendicular to these two axes. The line 26 is thus perpendicular to the paper and is referred to herein as the common normal to the axis of the gear and tool. The point which in Figure 1 represents the common normal 26, also determines the center of crossed axes.

The teeth 30 of the cutter are illustrated on an enlarged scale in Figures 2 and 3. Each of these teeth is provided with a series of gashes 32 leaving intermediate ribs or lands 34, the alternate ribs or lands and gashes extending up and down the sides of the teeth parallel to the plane of rotation. If the teeth were uniform from end to end they would enter into tight mesh adjacent the point 26 but due to the small angle $a$ between the axis 22 of the gear and the axis 24 of the cutter, the contact between the teeth of the gear and cutter would extend substantially for the full length of the teeth of the cutter. This condition is undesirable and accordingly the teeth of the cutter are modified as illustrated in Figure 2. The teeth are generally involute teeth conjugate to the teeth of the gear 12 but are modified therefrom by being of gradually reduced chordal thickness from one end thereof to the other. A chordal thickness of an intermediate point is indicated in Figure 1 by the dimension $d$. Not only are the teeth of decreasing chordal thickness from one end to the other, but the chordal thickness decreases at an increasing rate from one end of the teeth to the other. This condition is illustrated by the fact that the sides of the teeth are illustrated as curved rather than straight. In other words, the teeth are not only tapered but they are tapered in a particular way such that the chordal thickness decreases from the large end of the teeth toward the small end at a rate which increases from one end of the teeth to the other.

The cutter 18 is positioned in mesh with the teeth of the gear 12 so that the common normal 26 to the axis of the gear and tool is located adjacent the side of the cutter on which the large end of the teeth are located. Thus, even though the gear and cutter are meshed at a relatively small crossed axes, clearance appears between the teeth of the gear and cutter at a point rather closely adjacent to the so-called center of crossed axes.

In carrying out the gear finishing operation the gear or cutter is positively rotated and the other part is driven through the meshed rotation of the gear and cutter. A relative traverse is introduced between the teeth of the gear and cutter in a direction parallel to the axis of the gear. Due to the decreasing chordal thickness of the teeth of the cutter, and due to the crossed axes relationship, the finishing action of the cutter on the gear is limited to a zone closely adjacent to the center of crossed axes or the common normal to the axis, and in order to distribute finishing action from one end to the other of the gear teeth, the relative traverse referred to is introduced. The complete operation may include a several of back and forth traverses between the gear and tool.

One of the important advantages of the particular shape of the tooth provided on the cutter is that at and closely adjacent to the center of crossed axes, the cutter tooth has a form which may be considered as tangent to an unmodified gear tooth, the outline of which is indicated at 36 in Figure 2.

It will of course be appreciated that the contour of the tooth illustrated in Figure 2 is greatly exaggerated. In practice the variation in chordal thickness of the tooth is relatively small, being between .0003 and .0015 inch. This variation in chordal thickness may be considered as a special relief provided toward the small end of the tooth to provide clearance thereat and to limit the zones of contact to areas adjacent the large end of the teeth, or in other words, adjacent the center of crossed axes.

The tooth form of the cutter may be considered as equivalent to the tooth form present at one end of the teeth of a crowned gear.

In use the cutter is employed with its axis as illustrated in Figure 1 where the axes of the gear and cutter are both parallel to a plane which is tangent to the pitch cylinder of the gear at a point determined by the intersection therewith of a line perpendicular to the axes of both gear and cutter. This last line is the common normal to the axis of the gear and cutter and appears as the point 26 in Figure 1.

The drawings and the foregoing specification constitute a description of the improved method of and tool for finishing gears in such full, clear, concise and exact terms as to enable any person skilled in the art to practice the invention, the scope of which is indicated by the appended claims.

What I claim as my invention is:

1. A generally cylindrical gear shaving cutter designed to operate at a very small crossed-axes with a cylindrical gear, the nominal helix angle of the cutter being different from the helix angle of the gear by a small amount so that the axis of the cutter crosses the axis of the gear at a small angle, the teeth of said cutter being serrated from top to bottom to provide cutting edges, and being modified so as to restrict the zone of contact of the teeth of the gear on the teeth of the cutter to a zone adjacent one end thereof, the modifications of the cutter teeth being such as to produce a decreasing chordal thickness from one end thereof to the other, the chordal thickness of the cutter teeth decreasing at a progressively increasing rate from the said one end to the other.

2. A cutter as defined in claim 1 in which the large end of the teeth of said cutter are substantially tangent to an imaginary unmodified tooth of the same nominal helix angle and tooth form.

References Cited in the file of this patent
UNITED STATES PATENTS

| | | |
|---|---|---|
| 2,126,178 | Drummond | Aug. 9, 1938 |
| 2,165,386 | Klomp | July 11, 1939 |
| 2,411,973 | Mentley | Dec. 3, 1946 |
| 2,499,167 | Sanborn | Feb. 28, 1950 |
| 2,617,331 | Austin | Nov. 11, 1952 |